No. 740,318. PATENTED SEPT. 29, 1903.
T. SCHERF.
CONSECUTIVE VIEW APPARATUS.
APPLICATION FILED NOV. 21, 1902.
NO MODEL. 6 SHEETS—SHEET 3.
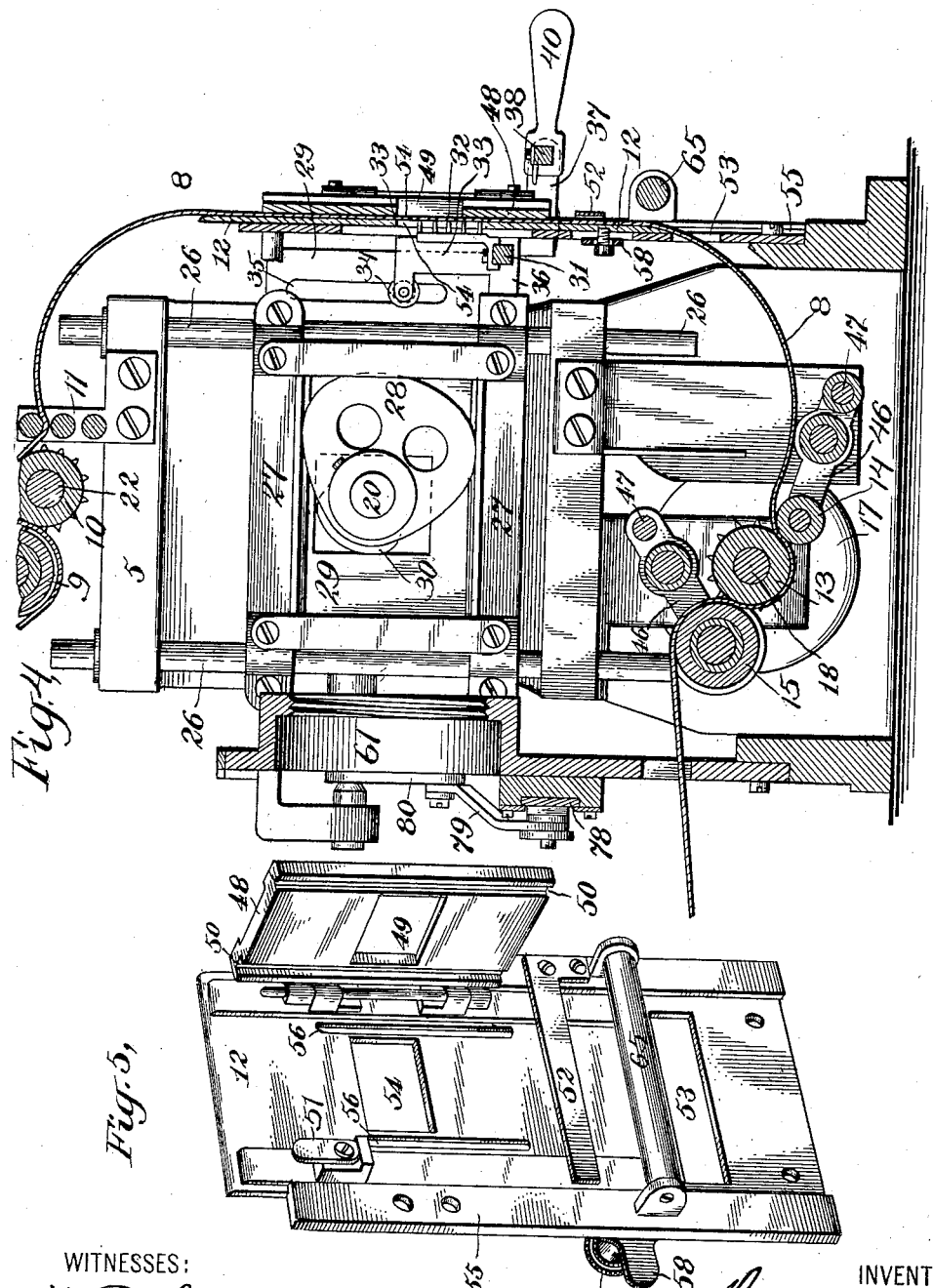

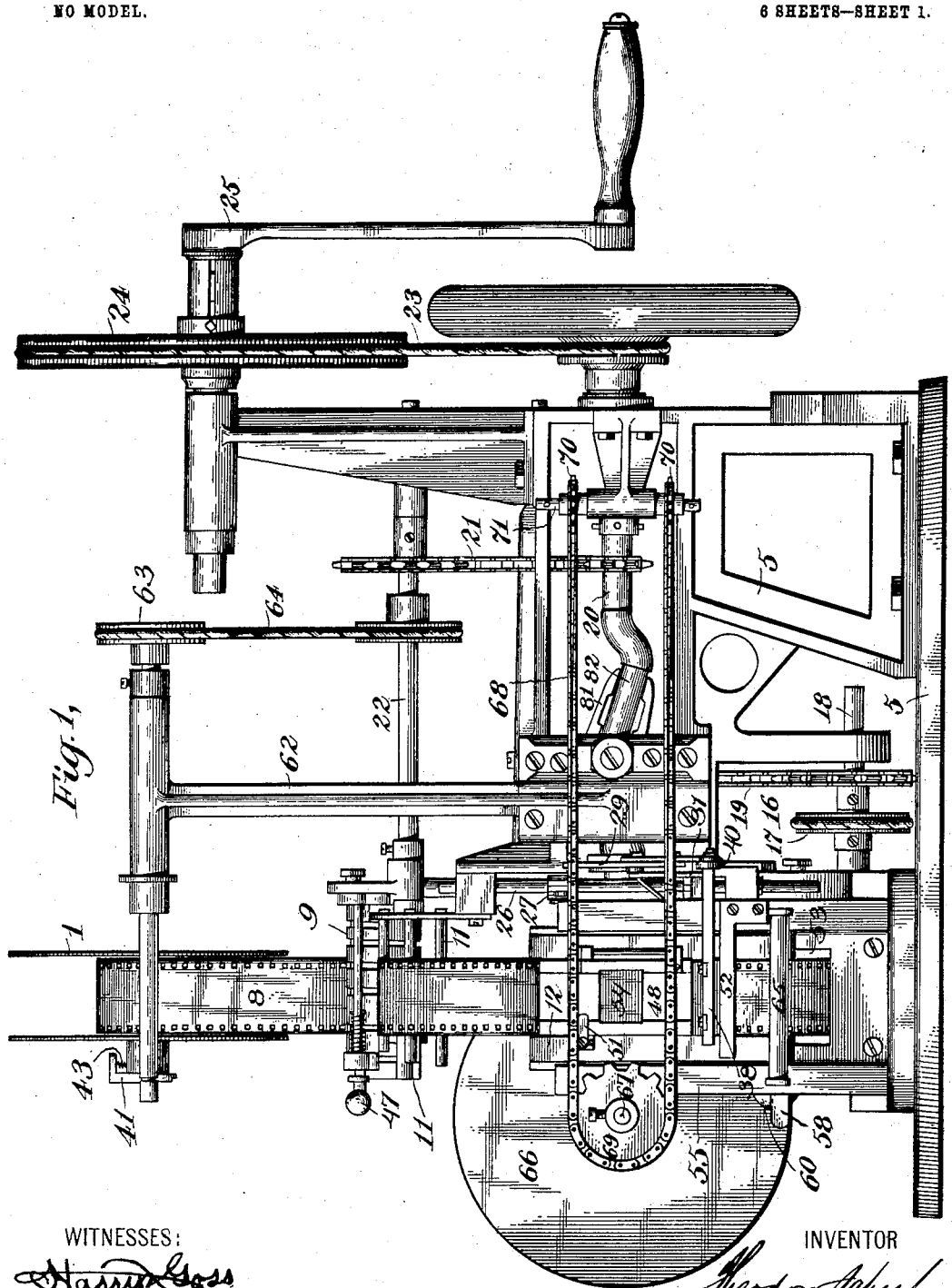

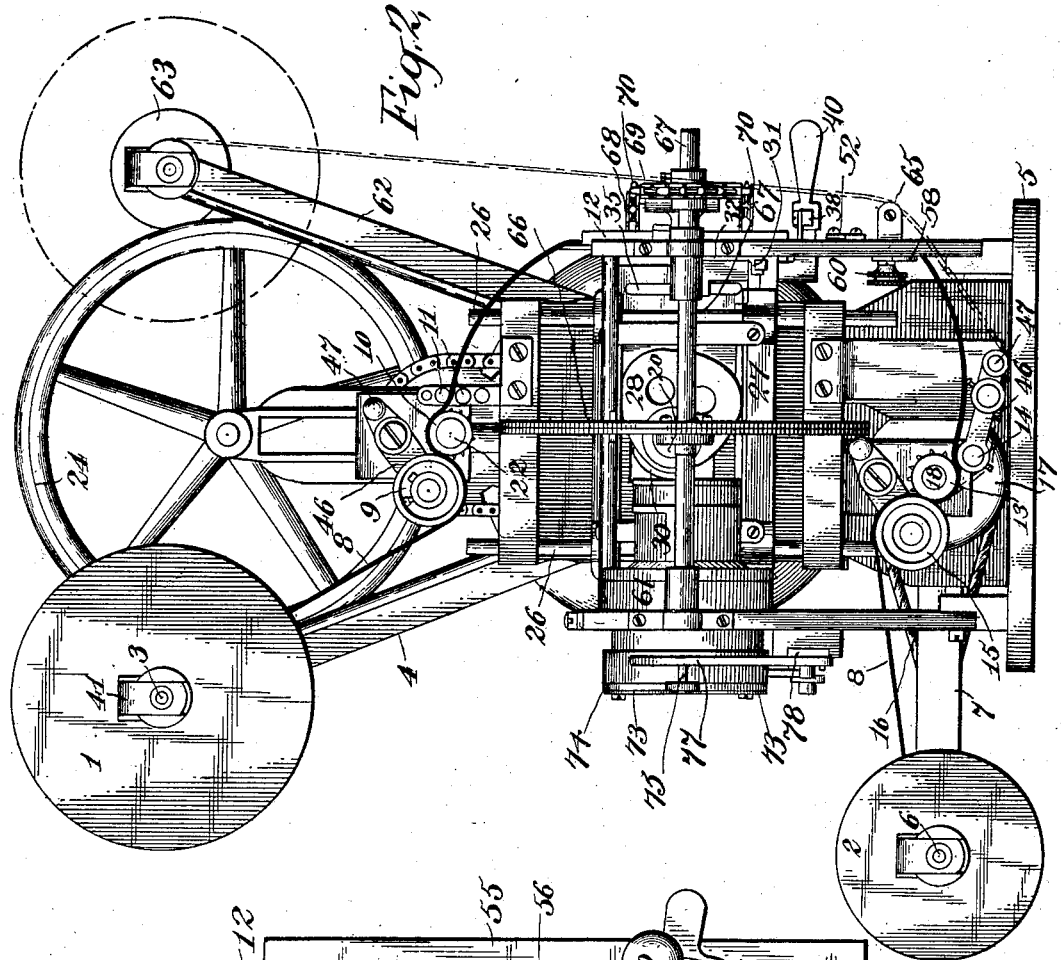

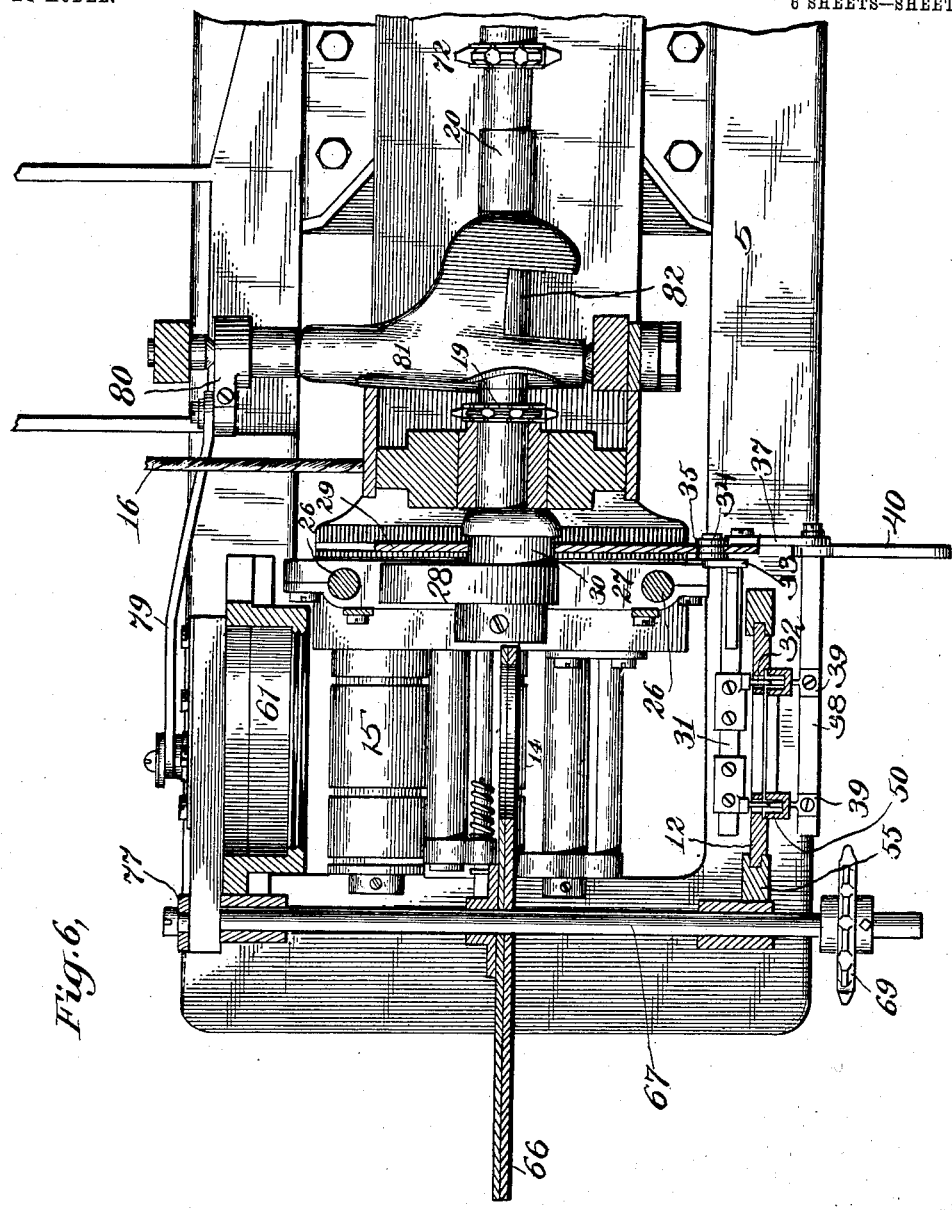

No. 740,318. PATENTED SEPT. 29, 1903.
T. SCHERF.
CONSECUTIVE VIEW APPARATUS.
APPLICATION FILED NOV. 21, 1902.
NO MODEL. 6 SHEETS—SHEET 5.
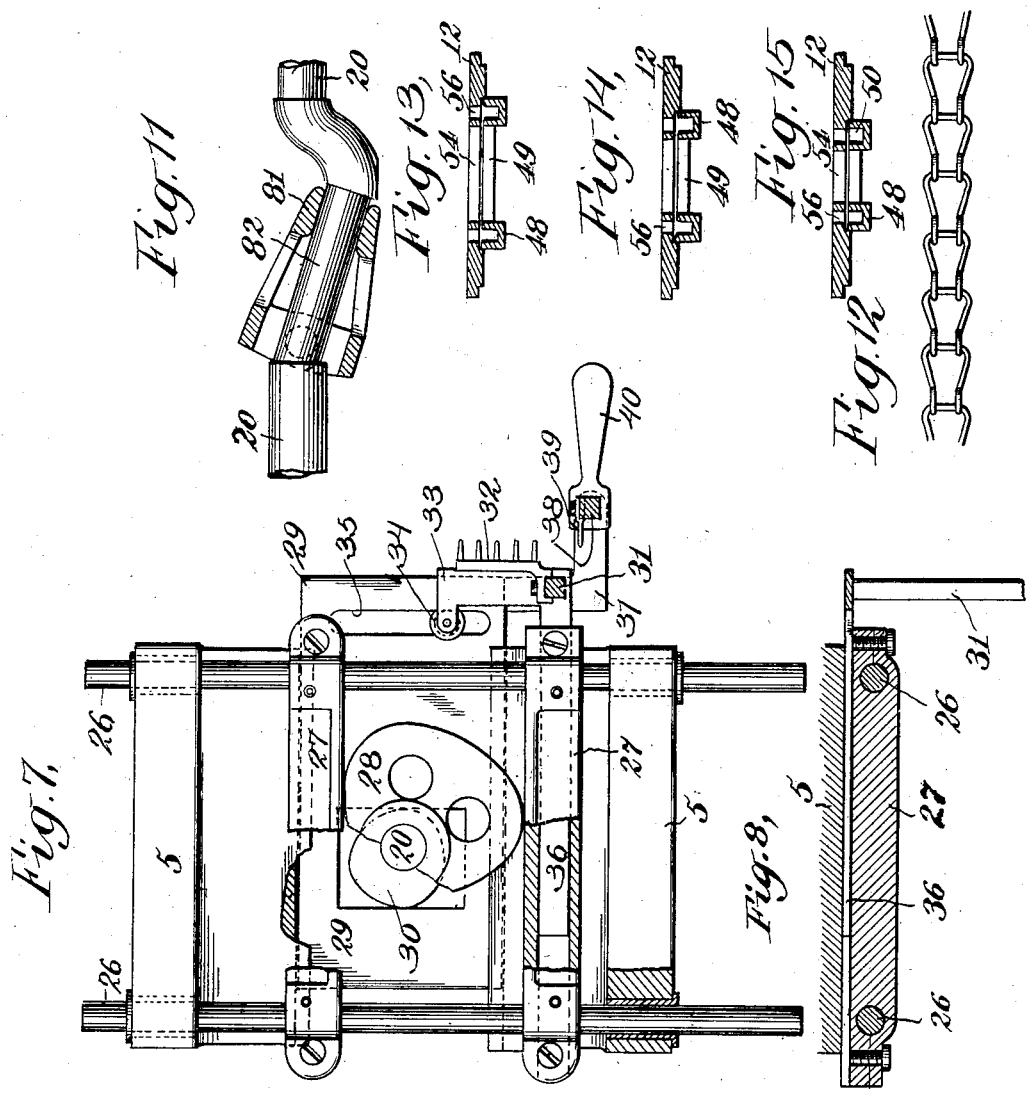
WITNESSES: INVENTOR
Theodore Scherf
BY
Chapin Hayford & Marble
his ATTORNEYS No. 740,318. PATENTED SEPT. 29, 1903.
T. SCHERF.
CONSECUTIVE VIEW APPARATUS.
APPLICATION FILED NOV. 21, 1902.
NO MODEL. 6 SHEETS—SHEET 6.
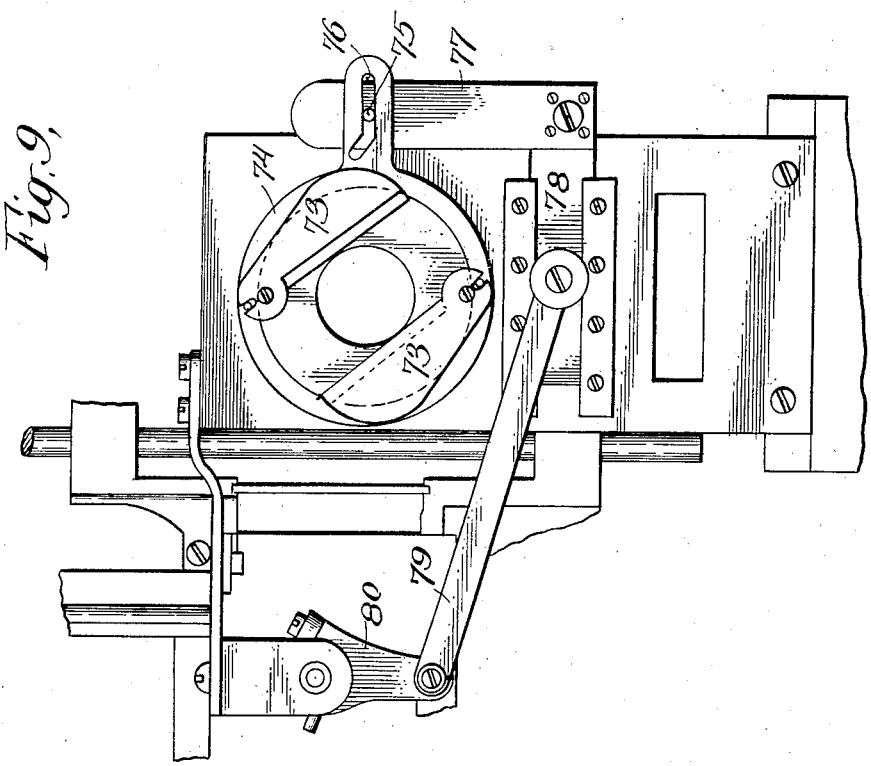
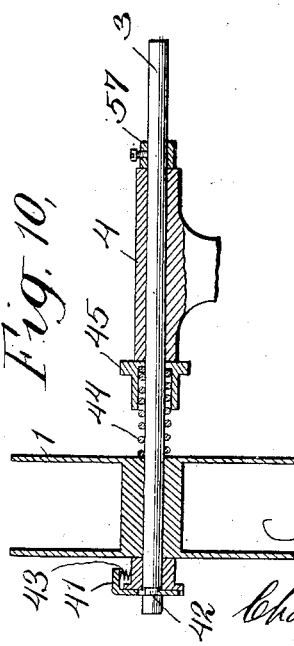
WITNESSES:
INVENTOR
Theodore Scherf
BY
ATTORNEYS No. 740,318. Patented September 29, 1903.

UNITED STATES PATENT OFFICE.

THEODORE SCHERF, OF ELIZABETH, NEW JERSEY, ASSIGNOR OF TWO-THIRDS TO JOHN H. WHITE AND EDWARD L. WHITE, OF ENGLEWOOD, NEW JERSEY.

CONSECUTIVE-VIEW APPARATUS.

SPECIFICATION forming part of Letters Patent No. 740,318, dated September 29, 1903.

Application filed November 21, 1902. Serial No. 132,210. (No model.)

*To all whom it may concern:*

Be it known that I, THEODORE SCHERF, a citizen of the United States of America, and a resident of Elizabeth, county of Union, State of New Jersey, have invented certain new and useful Improvements in Consecutive-View Apparatus, of which the following is a specification, reference being had to the accompanying drawings, forming a part thereof.

My invention relates to improvements in consecutive-view apparatus, and particularly to combined photographing and projecting consecutive-view apparatus; and my invention consists in novel mechanism for feeding the record strip or film and for holding the same stationary during the intervals of exposure, in novel means for adjusting the machine for different widths of record-strip, in novel means for adjusting the machine for variation in relative arrangement of the side perforations in the record-strip with respect to the axes of the pictures thereof, in novel shutter-operating apparatus, and in various other features, all as hereinafter described, and set forth in the claims.

The objects of my invention are to improve the construction of consecutive-view apparatus, such as above mentioned, to avoid vibration, to avoid mutilation to or other injury of the record strip or film, to adapt the machine for rapid operation, to adapt the machine for feeding the record-strip in either direction at will, to render the machine readily adjustable for different widths of record-strip, to improve the construction and operation of the shutter mechanism of such machine, to provide for adjustment of the exposure-window, and generally to make the machine as simple, compact, durable, and reliable as possible.

I will now proceed to describe my invention with reference to the accompanying drawings and will then point out the novel features in claims.

In the drawings, Figure 1 is a view of the rear of the machine, showing particularly the mechanism for guiding the record-strip and for operating the main strip-feeding devices and the rotary shutter. Fig. 2 is a side view of the machine, taken from the left of Fig. 1, and shows particularly the main strip-feeding device and one of the cams for operating the intermittent feeding device. Fig. 3 is a detail view of the runway through which the record-strip passes, showing particularly the device used for adjusting the vertical position of the exposure-window. Fig. 4 is a detail sectional view showing the strip-feeding devices. Fig. 5 is a detail view of the runway through which the record-strip passes, taken from the side opposite that shown in Fig. 3, the door of this runway being open. Fig. 6 shows a horizontal sectional view looking downwardly, the section being taken on the center line of the main cam-shaft. Fig. 7 is a detail view, partially diagrammatic, of the intermittent feeding mechanism. Fig. 8 is a detail horizontal section showing the connection between the record-strip-feeding device and the vertically-movable slide. Fig. 9 is a detail view showing the mechanism for operating the reciprocating shutter. Fig. 10 shows a detail section of one of the reels of the machine mounted on its spindle and provided with a friction-brake, such as is used in connection with the supply-reel. Fig. 11 shows a partial vertical longitudinal section in the axial line of the main cam-shaft, showing the cam-follower which operates the reciprocating shutter. Fig. 12 is a detail view of the sprocket-chain employed for operating the rotary shutter. Figs. 13, 14, and 15 show sections of runways for different widths of record-strip.

I will first describe my machine as adapted for use as a projecting-machine. This machine comprises a supply-reel 1, from which the record-strip is drawn, and a receiving-reel 2. The former is mounted on a spindle 3, carried by an upright 4, projecting from the base 5 of the machine, while reel 2 is mounted upon a spindle 6, carried by a bracket 7, forming a portion of the frame of the machine. The record-strip 8 passes from reel 1 underneath an idler-roller 9, and thence over a toothed drum 10 and between guide-fingers 11, and thence through a runway 12, between a second toothed feeding-drum 13, mounted upon a shaft 18, and a retaining-roll 14, and thence over an idler-roller 15, and so to the receiving-reel 2. This reel is driven frictionally. I have shown for the purpose a belt 16, driven from a belt-wheel 17 upon a shaft 18, driven by means of a sprocket-chain 19 from the main cam-shaft 20. The feeding-drum 10 is driven from the main cam-shaft 20 by means of a sprocket-chain 21, passing over a sprocket-wheel on said cam-shaft and another sprocket-wheel on the shaft 22, on which the feeding-drum 10 is mounted. The cam-shaft 20 is itself driven by means of a belt 23 from a band-wheel 24, arranged to be rotated by means of a crank 25. Feeding-drums 10 and 13 rotate constantly during the operation of the apparatus and at the same speed. The record-strip 8 is provided with perforations corresponding to the teeth on the feeding-drums, so that these drums feed the strip positively and without slipping of the strip. It is necessary, however, that the record-strip shall be fed intermittently across the field of exposure, so that said strip may be stationary during the intervals of exposure. For this purpose I employ an improved mechanism which engages the strip positively and moves the same forward with great rapidity during the intervals between exposures. Means are provided, however, for holding the strip absolutely stationary in the field of exposure during the intervals of exposure. This intermittent feeding mechanism comprises a strip-feeding device which usually has the form of two toothed combs, the teeth or feed-fingers of which are adapted to enter the perforations in the record-strip, these combs being connected to two sliding members mounted to reciprocate transversely at right angles with respect to each other and each capable of movement in one direction only. Such intermittent feeding device is shown particularly in Figs. 4, 6, 7, and 8. One of the said sliding members or slides consists of two rods 26, arranged to slide vertically in bearings formed in the frame of the machine, and a cam-frame 27, secured to said rods. Within said frame works a cam 28, mounted upon the cam-shaft 20 and arranged to reciprocate said frame and rods vertically. The other slide is a plate 29 in rear of the cam 28 and mounted to slide horizontally in guideways in the frame of the machine. This plate is moved backward and forward at suitable times by a second cam 30, likewise mounted on the cam-shaft 20. The cam-frame 27 in its movement carries with it the record-strip-feeding device comprising a bracket 31, carrying two vertically-arranged combs 32, having teeth spaced in accordance with the spacing of the perforations in the record-strip and set opposite said perforations. This bracket has an upwardly-turned portion 33, carrying a lug or roller 34, working in a vertical slot 35 in the horizontally-movable slide 29. Said bracket is carried by said cam-frame 27 by means of a bar 36, secured to or forming a part of said bracket and mounted to slide horizontally within a bearing in cam-frame 27. The said bracket will therefore partake of the vertically-reciprocal movements of the cam-frame 27, but will further be permitted a relative horizontal movement as well, and such movement will be imparted to it by its connection with the plate 29. It will thus be seen that the connection of the parts is such that the bracket 31 and its combs 32 partake both of the vertical reciprocating motion of the cam frame or slide 27 and of the horizontal reciprocating motion of the plate or slide 29. These motions are so timed that during the interval of exposure the combs 32, then out of engagement with the record-strip, will be moved upward by the upward movement of the slide 27 and near the conclusion of the exposure period will be advanced into engagement with the record-strip through the movement of the horizontal slide 29, the teeth of the combs 32 being thereby caused to enter the perforations of the record-strip. After the conclusion of the exposure period the slide comprising the frame 27 and rods 26 will be moved downwardly by the action of the cam 28, and thereby the combs 32 carried downwardly, carrying with them the record-strip. Such movement continues for a space just sufficient to bring a new picture on the record-strip into registry with the exposure-window, and then such downward motion ceases, and the cam 30 will operate the plate 29 to cause the combs 32 to retreat from the record-strip. These operations are repeated many times in a second. The parts are very light, their motions are comparatively slight, and the cams are so shaped as to move the parts as gently as possible. The cams are, moreover, symmetrical, so that they will operate the parts equally well in either direction.

The horizontal slide 29 is provided with a bracket 37, which projects to the rear of the guideway 12 and is provided with a horizontal arm 38, parallel with the front of said guideway, pivoted to the bracket 37 for purposes of adjustment, as hereinafter described, and provided with teeth 39, adapted to enter perforations of the record-strip just as the combs 32 are withdrawn from engagement with said record-strip. The teeth 39 have no vertical motion except for the purpose of adjustment, and since they engage and disengage the record-strip just when the combs 32 disengage or engage the same, respectively, said teeth 39 serve as a record-strip-holding device to hold the record-strip stationary during the intervals of exposure and to prevent slipping thereof due to momentum or otherwise.

Since it sometimes happens that record-strips differ slightly as to the spacing of the holes in their margins, with which the combs 32 and the teeth 39 engage, (this being due to varying atmospheric conditions and other causes,) it is desirable to be able to adjust the teeth 39 with respect to those of the combs 32, and for this purpose I have made provision whereby the teeth 39 may be slightly tilted either upward or downward from the horizontal position, so that such teeth will surely enter the perforations of the record-strip, whether said perforations be spaced farther apart or closer together than normally. Such variation in any case is small, and by tilting the teeth slightly, which may be done by the handle 40, said teeth, as they engage the record-strip, will crowd the same slightly upward or downward, as may be required, thus bringing the record-strip at all times into perfect registry. The teeth will remain in the position to which they are adjusted against accidental displacement by friction.

The operation of the mechanism for feeding the record-strip is as follows: The machine being in operation, the toothed drum 10 continuously draws said strip from the supply-reel 1 and feeds the same forward toward the runway 12. Through this runway said strip is fed intermittently by the intermittent feeding and holding device just described and comprising the combs 32, fingers 39, and the parts for giving motion thereto. Since the strip is fed through the runway intermittently, said strip will form a loop above the guideway during the intervals between the feeding of the strip through said guideway, and such loop will be taken up, or nearly so, upon the next downward motion of the combs 32. The intermittent feeding mechanism, therefore, is required to set into motion and to stop only a small length of the record-strip, the inertia of which is inconsiderable. From the runway the record-strip is fed onward by the sprocket-drum 13 to the receiving-wheel 2. The friction mechanism by which this receiving-wheel is driven is arranged to tend to drive said wheel even when winding up thereon first begins at a speed greater than the rate of delivery of the picture-strip thereto by the drum 13; but the driving-belt slips on its belt-wheels, so that excessive tension is not imposed upon the picture-strip. The toothed drum 13 prevents the picture-strip from being wound up more rapidly than it is fed forward by the toothed drum 10 above, and therefore during the downward motion of the combs 32 a loop will be formed between the runway 12 and the drum 13, which loop, however, will be taken up, or nearly so, as soon as the combs 32 cease to feed the strip downward.

To facilitate the removal and insertion of record-strips, both reels 1 and 2 are made removable, being held upon their spindles by sliding plates 41, which normally are held in engagement with grooves 42 in said spindles by springs 43, as shown in the detail section of the supply-reel, Fig. 10. By depressing these sliding plates 41 they are freed from engagement with said grooves, and the reels may be slipped from their spindles.

Upon the spindle of the receiving-reel there is a spiral spring 44, normally pressing against the hub of the receiving-reel and against a bushing 45, interposed between said spring and the bracket 4, by which said reel is supported. The spindle 3 is adjustable longitudinally in said bracket by means of a collar 57, normally held in place by set-screws, and by adjusting this spindle laterally the pressure exerted by said spring 44 may be adjusted as desired. This spring forms a friction-brake which prevents overrunning of the reel by momentum or otherwise.

To facilitate threading the record-strip through the machine, the guide-rollers 9 and 15 and the retaining-roller 14 are mounted upon swinging hangers 46, which are normally held in their operative positions by spring-pressed pins 47 engaging holes in suitable stationary portions of the frame of the machine. To further facilitate threading the record-strip through the machine, the runway 12 is provided with a swinging door 48, Fig. 5, which contains an exposure-window 49 in registry with the corresponding window 54 of runway 12 and is provided with grooves 50 on its inner side to receive the teeth of the combs 32. This door is held closed normally by a latch 51. Beneath said door is a finger 52, which serves to guide the picture-strip in its passage to the opening 53 in the frame-plate 55.

It often happens that it is desirable to use in the same machine record-strips of different widths. For this purpose I mount the plate 12, forming the runway, in grooves in the frame-plate 55, so that the said plate 12 may be removed. The same machine may be provided with a number of these plates 12, having exposure-windows 54 of different widths and having the grooves 50 of their swinging doors 48 and the slots 56, through which the combs 32 play, differently spaced, according to the distance between the perforations of the record-strips to be used in the machine. (See particularly Figs. 13, 14, and 15.) The combs 32 are adjustably mounted on the bar 31, and the bar 38, carrying the stop-fingers 39, is removably secured to the bracket 37, so that when the adjustment of the machine is to be changed to accommodate a record-strip of different width from that for which the machine has been adjusted the combs 32 may be readjusted and the bar 38 may be removed and a corresponding bar having teeth 39, spaced in accordance with the spacing of the perforations in the new record-strip, may be inserted.

It is desirable that this machine shall be capable of using record-strips intended for machines of other types—such, for example, as the record-strips which may be bought in the market and are not intended for any particular machine. Since the side perforations of such strips do not always bear the same relation to the axes of the pictures of said strip, it is necessary to provide means for adjusting vertically the runway 12, in which and in the door 48, carried by it, are the exposure-windows, in order that these windows may always register perfectly with the pictures on the strip. For this purpose a lever 58, Fig.

3, is pivoted to the front side of the frameplate 55 and is connected to the runway 12 by a screw 59, working in a slot in the said lever. By moving this lever up or down the runway may be adjusted to bring the exposure-windows into perfect registry with the pictures on the record-strip. A clamping-nut 60 is provided for clamping this lever 58 in any position in which it may have been adjusted.

As above stated, this machine is intended for use both as a projecting-machine and as a kinetoscopic camera. When used as a camera, it may happen that the receiving-reel 2, if in the position shown in Fig. 2, would be within the field of the lens, which is within the lens-mounting 61. To avoid this, the machine is provided with a second bracket 62, similar to bracket 4, but upon the opposite side of the machine, which bracket is also provided with a spindle upon which the receiving-reel may be mounted and with a belt-wheel 63, arranged to be driven from shaft 22 by a belt 64. When the machine is to be used as a camera, with a lens of such focus that the reel 2, if in the position shown in Fig. 2, would be in the field of the lens, this reel is removed from spindle 6 and is placed upon the spindle of bracket 62, the record-strip in that case being carried around the guide-roller 15, under the retaining-roll 14, and over a guide-roller 65, Fig. 2, and thence to the receiving-reel in its new position, this path of the record-strip being indicated in dotted lines in Fig. 2.

I have shown the machine as provided with two shutter mechanisms, one of which is especially intended to be used when the machine is used as a projecting-machine, and both of which may be used when the machine is used as a camera. When the machine is to be used for projecting, it is desirable to provide as long a period of exposure (or illumination) as possible, while during the taking of pictures it is necessary that the intervals of exposure shall be much briefer. For the latter use a revolving shutter is most suitable, and therefore I have shown the shutter-disk 66 mounted on a shutter-shaft 67 and arranged to be rotated by means of a sprocket-chain 68, passing over a sprocket-wheel 69 on said shaft, over guide sprocket-wheels 70 on a vertical spindle 71, and over a sprocket-wheel 72, Fig. 6, on shaft 20. In Fig. 1 this sprocket-chain 68 is represented by the conventional representation of a sprocket-chain; but the chain which I prefer to use is of the type shown in the detail view, Fig. 12, which permits a certain amount of twisting, so that the chain may be used for transmitting motion between two sprocket-wheels rotating in planes at right angles to each other. The other shutter (see Fig. 9) is a swinging shutter, having one or more members 73 (here shown as two) pivoted to the frame of the machine. An operating-ring 74, having a laterally-extending arm, is rotatably mounted upon the frame of the machine and is provided with pins adapted to engage the outer ends of the said shutter members, as shown. The laterally-extending arm of the operating-ring 74 has a cam-slot 76, to which is fitted a pin 75, carried by an upright 77, secured to a reciprocating slide 78. A reciprocation of the slide 78 causes the pin 75 to travel backward and forward in the slot 76 and while in proximity to the inner end thereof will partially rotate the operating-ring 74, and thereby cause the shutter members 73 to momentarily pass in front of the lens. The slide is connected by a pitman 79 to an arm 80, carried by the swinging cam-follower 81, engaging the peculiar angularly-offset cam portion 82 of cam-shaft 20. This cam portion 82 is cylindrical and corresponds to a crank-pin set at an angle to and intersecting the cam-shaft 20 instead of being parallel to, but offset from, the shaft, as an ordinary crank-pin would be. The forked cam-follower 81 embraces this cam 82 on both sides. Moreover, its pivotal axis intersects the axis of cam-shaft 20 at the point where the axis of cam 82 intersects or departs from the axis of said shaft. Therefore the follower is always parallel to the cam 82 in the plane of vibration of said follower, and the motion imparted by the cam to the follower is very easy, enabling the shutter to work without vibration.

When the machine is operating as a projecting apparatus, the chain 68, connecting the rotary shutter with the main cam-shaft, may be disconnected and the rotary shutter held stationary, with its opening in line with the lens, and the reciprocating shutter may be operatively employed alone. When the machine is used as a kinetoscopic camera, both shutters may be permitted to operate, for the reason that both shutters operate synchronously, and the period of exposure of the rotating shutter is less than that of the reciprocating shutter.

It will of course be understood that I do not desire to be limited only to the precise construction and combination of parts as herein described, as such forms only one embodiment of my invention and is obviously capable of many modifications without departing from the spirit and scope of my invention. It is further obvious that certain parts of my invention are capable of use with other parts of different construction than shown herein.

What I claim is—

1. In consecutive-view apparatus, the combination with means for supporting a record-strip, of two slides each mounted to reciprocate in one direction only, the direction of such reciprocal movements being transverse of each other, and a record-strip-feeding device movable with respect to both said slides, but connected thereto to partake of both their reciprocal movements.

2. In consecutive-view apparatus, the combination with means for supporting a record-strip, and a perforated record-strip so supported, of two slides mounted to reciprocate transversely with respect to each other, but to be stationary with respect to each other's reciprocatory movement, and a feed-finger adapted to enter the perforations in the record-strip, and movable with respect to both said slides, but connected thereto to partake of both their reciprocal movements.

3. In consecutive-view apparatus, the combination with means for supporting a record-strip, of two slides mounted to reciprocate substantially at right angles with respect to each other, but to be stationary with respect to each other's reciprocatory movement, synchronously-operating cams for imparting such movement to the slides, and a record-strip-feeding device movable with respect to both said slides, but connected thereto to partake of both their reciprocal movements.

4. In consecutive-view apparatus, the combination with means for supporting a record-strip, of a slide mounted to horizontally reciprocate in guideways stationary as to any transverse movement, another slide mounted to reciprocate transversely with respect to the first-named slide, and a record-strip-feeding device connected with both the said slides, and having a perpendicularly-reciprocal movement with respect to the first-named slide, and a horizontally-reciprocal movement with respect to the last-named slide.

5. In consecutive-view apparatus, the combination with means for supporting a record-strip, of a slide mounted to reciprocate in one direction only, such direction being toward and away from the record-strip when so supported, another slide mounted to reciprocate in one direction only, such direction being transversely with respect to the first-named slide, and a record-strip-feeding device movable with respect to both said slides, but connected thereto to partake of both their reciprocal movements.

6. In consecutive-view apparatus, the combination with means for supporting a record-strip, of a slide mounted to reciprocate toward and away from the record-strip when so supported, another slide mounted to reciprocate transversely with respect to the first-named slide, and a record-strip-feeding device connected to both said slides to partake of the movement of each slide and to have also a movement with respect to each slide in the line of movement of the other slide.

7. In consecutive-view apparatus, the combination with means for supporting a record-strip, of two slides, guideways for said slides permitting movement of each slide in one direction only, means for reciprocating said slides transversely with respect to each other, a record-strip-feeding device connected to said slides to partake of both their reciprocal movements, and a record-strip-holding device connected to one of said slides to partake of its reciprocal movement only.

8. In consecutive-view apparatus, the combination with means for supporting a record-strip, of two slides, guideways for said slides permitting movement of each slide in one direction only, means for reciprocating said slides transversely with respect to each other, a record-strip-feeding device movable with respect to both said slides, but connected thereto to partake of both their reciprocal movements, and a record-strip-holding device connected to one of said slides to partake of its reciprocal movement only.

9. In consecutive-view apparatus, the combination with means for supporting a record-strip, and a perforated record-strip so supported, of two slides mounted to reciprocate transversely with respect to each other, but to be stationary with respect to each other's reciprocatory movement, a feed-finger adapted to enter the perforations in the record-strip, movable with respect to both said slides, but connected thereto to partake of both their reciprocal movements, and a record-strip-holding device connected to one of said slides to partake of its reciprocal movement only.

10. In consecutive-view apparatus, the combination with means for supporting a record-strip, of two slides mounted to reciprocate substantially at right angles with respect to each other, but to be stationary with respect to each other's reciprocatory movement, synchronously-operating cams for imparting such movement to the slides, a record-strip-feeding device movable with respect to both said slides, but connected thereto to partake of both their reciprocal movements, and a record-strip-holding device connected to one of said slides to partake of its reciprocal movement only.

11. In consecutive-view apparatus, the combination with means for supporting a record-strip, of a slide mounted to horizontally reciprocate in guideways stationary as to any transverse movement, a record-strip-holding device connected to reciprocate with said slide, another slide mounted to reciprocate transversely with respect to the first-named slide, and a record-strip-feeding device connected with both the said slides, and having a perpendicularly-reciprocal movement with respect to the first-named slide, and a horizontally-reciprocal movement with respect to the last-named slide.

12. In consecutive-view apparatus, the combination with means for supporting a record-strip, of a slide mounted to reciprocate in one direction only, such direction being toward and away from the record-strip when so supported, a record-strip-holding device connected to partake of the reciprocal movement of the said slide, another slide mounted to reciprocate transversely with respect to the first-named slide, and a record-strip-feeding device movable with respect to both said slides, but connected thereto to partake of both their reciprocal movements.

13. In consecutive-view apparatus, the combination with means for supporting a record-strip, of a slide mounted to reciprocate toward and away from the record-strip when so supported, a record-strip-holding device connected to said slide to partake of its reciprocal movement, another slide mounted to reciprocate transversely with respect to the first-named slide, and a record-strip-feeding device connected to both said slides to partake of the movement of each slide, and to have also a movement with respect to each slide in the line of movement of the other slide.

14. In consecutive-view apparatus, the combination with feeding mechanism for a record-strip, of a runway for the strip adapted to support and carry a portion thereof, and having an exposure-window, said runway adjustable, together with the portion of the said strip carried thereby, in the direction of movement of the strip.

15. In consecutive-view apparatus, the combination with feeding mechanism for a record-strip, of a runway for the strip adapted to support and carry a portion thereof, and having an exposure-window, said runway adjustable, together with the portion of the said strip carried thereby, in the direction of movement of the strip, and means for adjusting said runway.

16. In consecutive-view apparatus, the combination with feeding mechanism for a record-strip, of a runway for the strip adapted to support and carry a portion thereof, and having an exposure-window, said runway adjustable, together with the portion of the said strip carried thereby, in the direction of movement of the strip, and means for adjusting and means for locking same in the position in which it is adjusted.

17. In consecutive-view apparatus, the combination with feeding mechanism for a record-strip, of a runway for the strip adapted to support and carry a portion thereof, and having an exposure-window, a frame in which said runway is mounted, together with the portion of the said strip carried thereby, and in which it is adapted to move in the direction of movement of the record-strip, and a shifting-lever for said runway.

18. In consecutive-view apparatus, the combination with feeding mechanism for a perforated record-strip having teeth adapted to engage perforations in such strip and feed the same forward positively, of a runway for the strip adapted to support and carry a portion thereof, and having an exposure-window, said runway adjustable, together with the portion of the said strip carried thereby, in the direction of the movement of the strip.

19. In consecutive-view apparatus, the combination with feeding mechanism for a perforated record-strip having teeth adapted to engage perforations in such strip and feed the same forward positively, of a runway for the strip adapted to support and carry a portion thereof, and having an exposure-window, said runway adjustable, together with the portion of the said strip carried thereby, in the direction of movement of the strip, and means for adjusting said runway.

20. In consecutive-view apparatus, the combination with feeding mechanism for a perforated record-strip having teeth adapted to engage perforations in such strip and feed the same forward positively, of a runway for the strip adapted to support and carry a portion thereof, and having an exposure-window, a frame in which said runway is mounted, together with the portion of the said strip carried thereby, and in which it is adapted to move in the direction of the movement of the record-strip, and a shifting-lever for said runway.

21. In consecutive-view apparatus, the combination of a rotary shutter having an aperture adapted to give relatively short exposures, a reciprocating shutter operating across the same optical axis, a main shaft, and means driven thereby for rotating one shutter and reciprocating the other.

22. In consecutive-view apparatus, the combination with a main cam-shaft having a shutter-cam thereon, a follower for said cam, a reciprocating shutter, and means for connecting said follower and shutter, of a shutter-shaft, a rotary shutter thereon arranged to operate across the same optical axis as the reciprocating shutter, and sprocket-gears and a sprocket-chain for driving said shutter-shaft from said main cam-shaft.

23. In consecutive-view apparatus, the combination with a driving-shaft having an angularly-offset cam portion, and a pivoted follower embracing on both sides the said offset portion of said shaft, of a pivoted shutter, and means connecting said follower and shutter for operating the latter.

24. In consecutive-view apparatus, the combination with a driving-shaft having an angularly-offset cam portion, and a pivoted jaw-shaped follower embracing the said offset portion of said shaft, the axis of said follower intersecting the axis of the driving-shaft, of a pivoted shutter and means connecting said follower and shutter for operating the latter.

25. In consecutive-view apparatus, the combination with a driving-shaft having an angularly-offset cam portion, and a pivoted jaw-shaped follower embracing the said offset portion of said shaft, the axis of said follower intersecting the axis of the driving-shaft at the point of departure of the axis of said angularly-offset portion from the axis of the driving-shaft, of a pivoted shutter and means connecting said follower and shutter for operating the latter.

26. In consecutive-view apparatus, the combination with a driving-shaft having a shutter-cam thereon, and a follower for said cam, of a reciprocating slide, means connecting the same with said follower, and a swinging shutter having a pin engaging a slot of said slide.

27. In consecutive-view apparatus, the combination with a driving-shaft having a shutter-cam, and a follower for said cam, of a shutter arranged to swing across the optical axis of the apparatus and pivoted at a point above such axis, a reciprocating slide mounted below said optical axis but having an upright extension in which is a slot engaged by a pin of said shutter, and a pitman connecting said follower and slide.

28. In consecutive-view apparatus, the combination with a driving-shaft having an angularly-offset cam portion, and a pivoted follower embracing on both sides the said offset portion of said shaft, of a pivoted shutter, a reciprocating slide having a slot engaged by a pin on said shutter, and a pitman connecting said slide and shutter.

29. In consecutive-view apparatus, the combination with feeding mechanism for a record-strip, and a lens-mounting, of two spindles for a receiving-reel, one below and in front of said lens-mounting, the other above and in rear of the same, and means for driving a receiving-reel on either of said spindles at will.

30. In consecutive-view apparatus, the combination with feeding mechanism for a record-strip, and a lens-mounting, of two spindles for a receiving-reel, one below and in front of said lens-mounting, the other above and in rear of the same, means for driving a receiving-reel on either of said spindles at will, and means for guiding a record-strip to said reel when mounted on the upper of said spindles.

31. In consecutive-view apparatus, the combination with means for guiding a record-strip, of a feeding device for said strip, comprising a support movable in the direction of motion of the strip, feed-fingers carried by said support and adjustable thereon toward and away from each other, and means for moving said support and feed-fingers and for bringing said fingers into and out of engagement with the record-strip.

32. In consecutive-view apparatus, the combination with means for guiding a record-strip, of feeding mechanism therefor comprising slides mounted to reciprocate transversely with respect to each other, a support movable with respect to both said slides, but connected thereto to partake of both their reciprocal movements, and feed-fingers carried by said support and adjustable thereon toward and away from each other.

33. In consecutive-view apparatus, the combination with feeding mechanism for a record-strip, of a frame, and a runway for the strip removably mounted in said frame and having an exposure-window.

34. In consecutive-view apparatus, the combination with feeding mechanism for a record-strip, of a frame, and a plurality of runways for the record-strip each adapted to be held by said frame but removable therefrom, said runways having exposure-windows of different sizes.

35. In consecutive-view apparatus, the combination with feeding mechanism for a record-strip, adjustable for different widths of strip, of a frame and a plurality of runways for the strip adapted to be removably mounted in said frame, and having exposure-windows corresponding to different widths of record-strips.

36. In consecutive-view apparatus, the combination with feeding mechanism for a record-strip comprising a support, feed-fingers thereon adjustable for different widths of record-strip, and means for moving said support in the direction of motion of said strip and for bringing the feed-fingers into and out of engagement with said strip, of a frame, and a plurality of runways for the strip removably mounted in said frame, and having exposure-windows of different sizes.

37. In consecutive-view apparatus, the combination with feeding mechanism for a record-strip comprising a support, feed-fingers thereon adjustable for different widths of record-strip, and means for moving said support in the direction of motion of said strip and for bringing the feed-fingers into and out of engagement with said strip, of a frame, and a plurality of runways for said strip adapted to be removably mounted in said frame, and having exposure-windows of different widths, and slots through which said feed-fingers may lie, differently spaced to correspond with record-strips of different widths.

38. In consecutive-view apparatus, the combination with means for supporting a record-strip, of two slides mounted to reciprocate substantially at right angles with respect to each other, but to be stationary with respect to each other's reciprocatory movement, synchronously-operating symmetrical cams for imparting such movement to the slides, said cams arranged to operate said slides the same in either direction of motion, and a record-strip-feeding device movable with respect to both said slides, but connected thereto to partake of both their reciprocal movements.

THEODORE SCHERF.

Witnesses:
C. F. CARRINGTON,
D. HOWARD HAYWOOD.